United States Patent [19]

Seilly

[11] 4,238,699

[45] Dec. 9, 1980

[54] ELECTRO-MAGNETIC DEVICES

[75] Inventor: Alec H. Seilly, North Wembley, England

[73] Assignee: Lucas Industries Limited, Birmingham, England

[21] Appl. No.: 59,247

[22] Filed: Jul. 20, 1979

[30] Foreign Application Priority Data

Aug. 5, 1978 [GB] United Kingdom ............... 32381/78
Apr. 19, 1979 [GB] United Kingdom ............... 13721/79

[51] Int. Cl.$^{3}$ ............................................. H02K 3/00
[52] U.S. Cl. ....................................... 310/27; 335/220
[58] Field of Search ........................ 310/27, 30, 14, 13; 335/220

[56] References Cited

U.S. PATENT DOCUMENTS

| | | | |
|---|---|---|---|
| 3,312,842 | 4/1967 | Heuchling et al. | 310/30 |
| 3,353,040 | 11/1967 | Abbott | 310/27 |
| 4,003,013 | 1/1977 | Seilly | 335/220 |
| 4,090,097 | 5/1978 | Seilly | 310/27 |
| 4,123,691 | 10/1978 | Seilly | 310/27 X |
| 4,145,625 | 3/1979 | Seilly | 310/27 |

*Primary Examiner*—Donovan F. Duggan

[57] ABSTRACT

An electro-magnetic actuator includes a pair of magnetizable members, the one member being hollow and surrounding the other member. The other member defines a plurality of axially spaced circumferentially extending first ribs which are of reducing diameter towards one end of the member. The one member is generally of tapering construction and defines second ribs complementary to the first ribs. Recesses are defined between adjacent pairs of first ribs and accommodate windings. When electric current is applied to the windings the members move axially relative to each other to reduce the reluctance of the magnetic paths defined by the two members.

14 Claims, 5 Drawing Figures

ELECTRO-MAGNETIC DEVICES

This invention relates to an electro-magnetic actuator and comprising a pair of members formed from magnetisable material, one of said members being hollow and being located about the other member, and windings associated with one of the members and which when supplied with electric current create magnetic fields which cause relative movement of the members.

The object of the invention is to provide such an actuator in a simple and convenient form.

Figure 1:
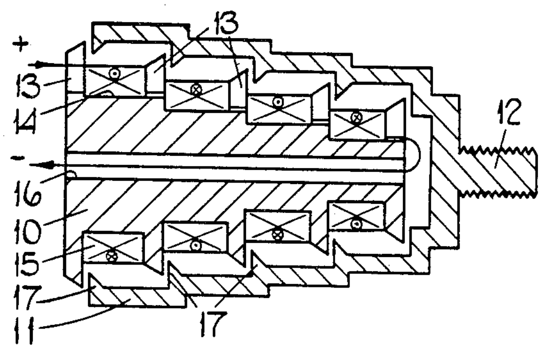
Figure 2:
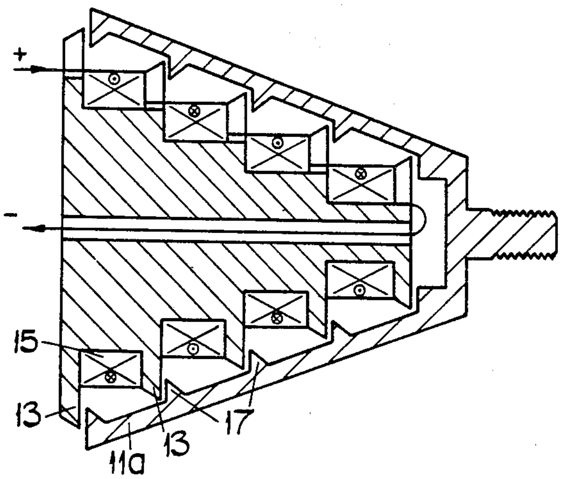
Figure 3:
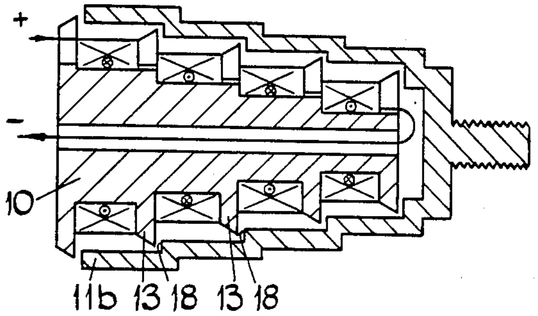
Figure 4:
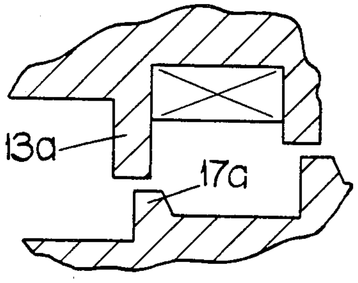
Figure 5:
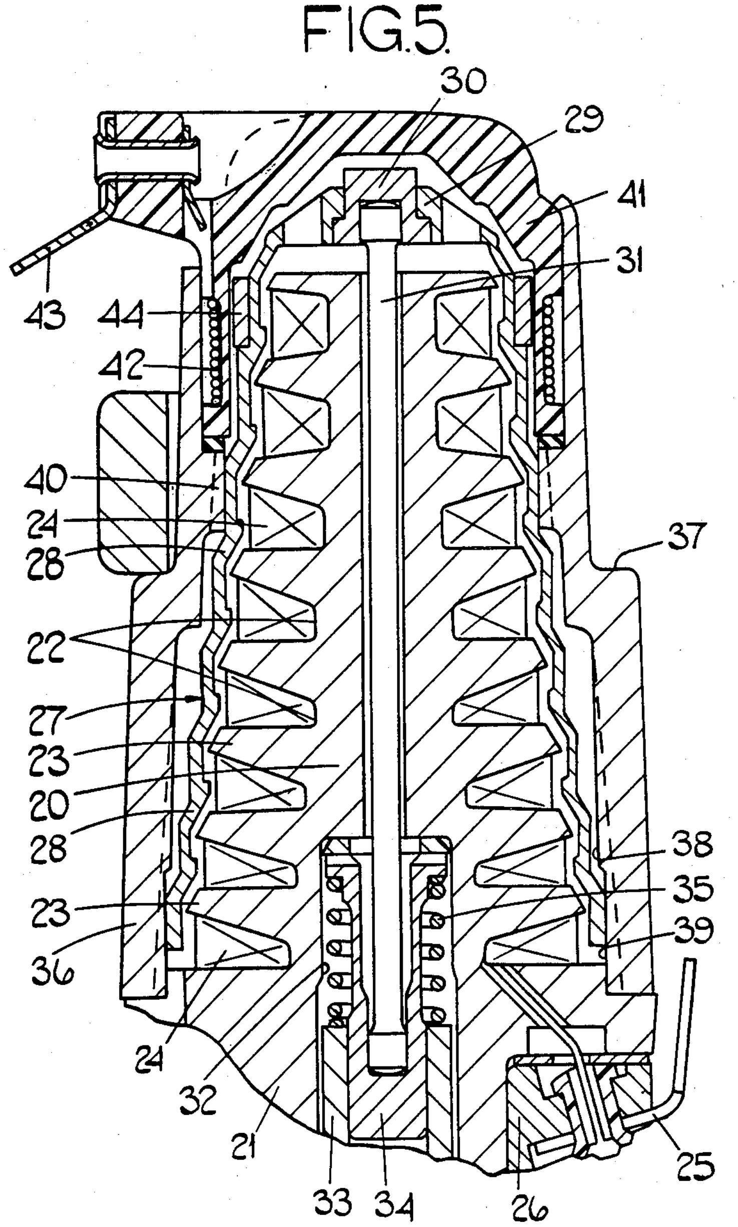

According to the invention in an electro-magnetic actuator of the kind specified, said other member defines a plurality of circumferential ribs on its periphery, the diameter of said ribs reducing from one end of the member to the other, adjacent ribs defining circumferential recesses, said windings being disposed in some or all of said recesses and the windings or connections thereto being such that when electric current is passed therethrough the direction of current flow in one winding will be opposite to the direction of current flow in a winding in an adjacent recess, said one member defining on its internal periphery circumferential surfaces complementary to the ribs on the other member, whereby when said other member is placed within said one member, the ribs on the other member will lie in close proximity to said surfaces on the one member, the arrangement being such that when said windings are energised the adjacent ribs on said other member will be magnetically polarised and the two members will move to reduce the reluctance of the magnetic paths defined between the members. In the accompanying drawings:

FIG. 1 is a sectional side elevation of one example of an electro-magnetic actuator in accordance with the invention, FIGS. 2 and 3 show views similar to FIG. 1 of modified constructions, FIG. 4 shows a portion of a further modified construction and FIG. 5 shows in sectional side elevation a practice arrangement of an actuator in accordance with the invention.

Referring to FIG. 1 of the drawings, the actuator comprises a pair of members 10, 11 formed from magnetisable material with the member 11 being of hollow cup-shaped form and surrounding the member 10. The base wall of the member 11 has secured thereto a threaded stud 12 whereby it can be connected to a part which it is required to move by means of the actuator. The member 10 is provided with means not shown whereby it can be secured to a support member.

The peripheral surface of the member 10 is provided with a plurality of ribs 13. The ribs 13 are circumferential ribs and between adjacent ribs are defined recesses 14. It will be noted that the ribs 13 reduce in diameter towards the closed end of the member 11 and further more, the base walls of the recesses 14 similarly reduce in diameter.

Each recess accommodates a winding 15 and conveniently the windings are connected in series and furthermore, are formed from a single length of wire, and connections between the adjacent windings passing through radial slots formed in the ribs 13. The return end of the winding which is in the smallest recess, passes through a drilling 16 extending between the ends of the member 10. The connections of the windings or preferably the directions in which the individual windings are wound, are such that when electric current is passed through the windings, the directions of current flow in adjacent windings are in the opposite direction. When current flows the ribs 13 are magnetically polarised and because of the fact that the directions of current flow in adjacent windings are opposite, adjacent ribs assume opposite magnetic polarity.

The member 11 is of tapered construction and defines on its internal peripheral surface, ribs 17 which are complementary to the ribs 13 on the member 10. As with the ribs on the member 10, the ribs on the member 11 are of differing diameters and the diameters of the two sets of ribs are so chosen in relation to each other that the member 11 can be moved over the member 10 by pure axial movement. Thus as shown in FIG. 1, pairs of ribs formed by the two sets of ribs, lie in close proximity. In the de-energised condition, the side faces or surfaces of the ribs are spaced by a small distance. When the windings are energised, the two members move relatively to each other to reduce the reluctances of the magnetic circuits formed between the two members and such movement reduces the air gaps between the side surfaces of the ribs of each pair of ribs. The magnetic flux passes through the material forming the member 11 between the ribs 17.

By virtue of the tapering construction it is possible to ensure that the air gaps between the surfaces on the ribs on the two members reduce as the members move relatively to each other. If a right cylindrical construction were adopted then if it is desired to form the two members as unitary elements it would be necessary to provide radial clearance between the surfaces. In the present construction it is possible to allow the ribs to engage each other thereby reducing the air gaps to substantially zero. A considerable force can therefore be generated by the actuator. In the arrangement shown in FIG. 1, the outer and inner peripheral surfaces of the member 11 are of stepped cylindrical form with the ribs 17 being located at the steps.

In the arrangement shown in FIG. 2 the outer member 11*a* is of hollow truncated form with the ribs 17 upstanding from the internal peripheral surface of the member. This produces a lighter construction than the stepped construction and providing the other dimensions of the actuator are the same, then the actuator shown in FIG. 2 should be capable of responding more quickly.

In the arrangement shown in FIG. 3, the member 11*b* is of stepped cylindrical form as with the case of the member 11 shown in FIG. 1. It will be noted however, that in FIG. 3 the ribs as such are omitted however, the steps 18 defined between the portions of differing diameter, define surfaces which are in close proximity to the side surfaces of the ribs 13 on the member 10.

As shown in FIGS. 1 and 2 the ribs 13 and 17 are of tapered construction. This is to reduce as far as is possible flux leakage between a rib 13 and the rib 17 which is adjacent the next adjacent rib 13. Such flux leakage would have the effect of creating a force acting in the opposite direction to the required force. In the case of the example shown in FIG. 3 the ribs 13 are again tapered for the same reason.

In the examples described above when the windings are energised the opposing surfaces of the ribs 13 and 17 move towards each other to reduce the reluctance of the various magnetic circuits. With the examples shown in FIGS. 1 and 2 it is possible as shown in FIG. 4 to reduce the diameters of the ribs 13*a* or increase the diameters of the crests of the ribs 17*a* so that the ribs can move into alignment with each other without touching. If the pairs of ribs are axially displaced then when the windings are energised they will tend to move into alignment with each other in order to reduce the reluctance of the various magnetic circuits. In this case it will be appreciated that the crests of the ribs are flat and substantially parallel to each other and to the longitudinal axis of the device.

In the example shown in FIG. 3 the crests of the ribs on the member 10 can be made flat and substantially parallel to the longitudinal axis to achieve the same effect.

Referring to FIG. 5 the actuator comprises a core member 20 which is integrally formed with a housing portion 21, the housing portion being a part of the of the device with which the actuator is associated. The core member is formed from magnetisable material and is of generally truncated conical configuration. It is provided with a plurality of circumferentially extending recesses 22 which define circumferentially extending ribs 23 and the further a particular rib is from the housing portion 21 the smaller is its diameter. Moreover, in general the further a particular recess is from the housing portion, the shallower is the recess whilst the width of the recess increases as the distance from the housing portion 21 increases.

The outer surfaces of the ribs 23 in this construction are inclined to the axis of the core member and located within each recess is a winding 24. The windings are connected in series in such a fashion than when electric current is passed through the windings the direction of current flow in adjacent windings is in the opposite direction. In this manner adjacent ribs 23 will be polarised to opposite magnetic polarity. Conveniently one end of one of the series connected windings is connected to the core member whilst the other end is led out to a terminal 25 which is mounted upon an electrically insulating block 26 carried by the housing portion 21.

Surrounding the core member 20 is an armature 27 and this is also formed from magnetisable material and has a thin section. The armature 27 can be regarded as a number of cylindrical hoops of reducing diameter connected together by inclined portions such as indicated at 28. The internal faces of the inclined portions 28 lie substantially parallel to the aforesaid inclined faces of the ribs 23.

The armature is of cup-shaped form and its base wall 29 is provided with a central aperture in which is located a plug 30 which serves as a location for a push rod 31 which extends with clearance through a drilling in the core member 20. As will be observed, the push rod extends within a counter bore 32 partly formed in the core member and extending within the housing portion 21. Located in the counter bore 32 is a sleeve 33 in which is slidably located a plunger 34. The plunger 34 accommodates the end of the push rod 31 remote from the plug 30 and the plunger is spring loaded by means of a coiled compression spring 35.

In use when the windings are energised the faces on the inclined portions 28 and the ribs 23 move towards each other and in so doing movement is imparted to the plunger 34 against the action of the spring 35. When the windings are de-energised then the armature, push rod and plunger are moved by the action of the spring 35.

Surrounding the armature is a hollow cover 36 which is formed from non-magnetic material conveniently as a diecasting from a zinc based alloy. The cover of the stepped outer peripheral surface and the sides thereof taper to permit its withdrawal from the die cavity. The internal peripheral surface is also of stepped form and is shaped to support the armature 27 for axial movement. The cover has an external step referenced 37 and the larger end portion of the cover, that is to say the portion defined between the step 37 and the housing portion 21 has its internal peripheral surface shaped to form a number of internal ribs 38. Defined between these ribs are recesses and the internal surfaces of the housing are tapered to permit withdrawal of the housing from the die. After removal of the housing from the die the ribs 38 are machined to define surfaces 39 which extend parallel to the axis of the core member 20 and define bearing surfaces which are engaged by the armature 27 at its wider end.

The cover is provided with a number of further ribs 40 and again when manufactured, these are tapered to permit removal of the casting from the die. Subsequently the internal surface of the ribs are machined to provide bearing surfaces for engagement by surfaces on the armature near the narrower end thereof.

The open end of the cover is closed by a non-metallic closure member 41 which is of generally cup-shaped form. The skirt of the closure member extends to adjacent an internal step defined in the cover 36 there being located between the closure member and the step an elastomeric sealing ring. The closure member is retained within the cover be deforming portions of the cover.

Forming no part of the present invention, a transducer is provided to enable the position of the armature to be electrically sensed and the transducer comprises a flat winding 42 which is wound within the circumferential recess in the end closure 41. The ends of the winding are connected to terminals 43 carried by a part moulded integrally with the end closure. Moreover, the armature mounts an electrically conductive ring 44 which is positioned adjacent the winding 42. When the latter is supplied with an alternating current, the inductance of the winding varies with movement of the armature.

It is desirable that the design of the actuator should be optimised so that the maximum performance is available for the minimum weight of material. Such optimisation is achieved by varying the width and the depth of the recesses 22. The recesses are dimensioned so that the winding areas of the recesses are substantially constant throughout the length of the member. Furthermore, the ribs 23 are dimensioned such that the circumferential rim area is substantially equal at the tip and at the root so that the flux density in the material forming the ribs remains substantially constant throughout the depth of the ribs. Similarly the area of the annulus formed between the bottoms of the recesses and the central hole is substantially equal to the area of the annulus of the armature in the zone associated with each recess.

I claim:

1. An electromagnetic actuator comprising a pair of members formed from magnetisable material, one of said members being hollow and being located about the other member, a plurality of circumferential ribs defined on the peripheral surface of the other member, the diameter of said ribs reducing from one end of the member to the other, recesses defined between adjacent ribs, windings disposed in some or all of said recesses, electrical connections between said windings, the windings or connections thereto being such that when electric current is passed therethrough the direction of current flow in one winding will be opposite to the direction of current flow in a winding in an adjacent recess, surfaces complementary to said ribs defined on the internal surface of the one member whereby when the other member is placed within the one member, the ribs on the other member will lie in close proximity to the surfaces respectively on the one member and when said windings are energised the adjacent ribs on said other member will be magnetically polarised and the two members will move to reduce the reluctance of the magnetic paths defined between the two members.

2. An actuator according to claim 1 in which said one member is of tapering form.

3. An actuator according to claim 1 in which said one member is provided with a plurality of ribs on its internal peripheral surface, the ribs on the one member being complementary to the ribs on the other member and defining said surfaces respectively.

4. An actuator according to claim 3 in which the internal and external surfaces of said one member are of stepped cylindrical form.

5. An actuator according to claim 3 in which said one member is of hollow truncated form.

6. An actuator according to claim 4 in which the ribs are located at the steps in the internal surface.

7. An actuator according to claim 3 in which the side surfaces of the ribs on the two members are spaced from each other by radially extending air gaps.

8. An actuator according to claim 3 in which the crests of the ribs are tapered on the sides thereof remote from the associated ribs.

9. An actuator according to claim 3 in which the associated ribs on the two members are spaced by longitudinally extending air gaps.

10. An actuator according to claim 2 in which said surfaces are defined by steps formed in the internal peripheral surface of said one member.

11. An actuator according to claim 1 in which the recesses are dimensioned so that the winding areas remain substantially constant throughout the length of the member.

12. An actuator according to claim 1 in which the circumferential area of each rib is substantially constant throughout the depth of the ribs.

13. An actuator according to claim 1 including a cover surrounding the one member, said cover defining bearing surfaces for said one member.

14. An actuator according to claim 13 in which said bearing surfaces are defined on longitudinal ribs defined on the internal surface of said cover.

* * * * *